United States Patent
Huang et al.

(10) Patent No.: US 8,698,775 B2
(45) Date of Patent: Apr. 15, 2014

(54) DRIVING METHOD, DRIVING DEVICE AND TOUCH SENSITIVE DISPLAY DEVICE USING THE SAME

(75) Inventors: Chiu-Huang Huang, Hsinchu County (TW); Wen-Hao Yu, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 676 days.

(21) Appl. No.: 12/888,378

(22) Filed: Sep. 22, 2010

(65) Prior Publication Data

US 2011/0316792 A1    Dec. 29, 2011

(30) Foreign Application Priority Data

Jun. 29, 2010    (TW) .............................. 99121386 A

(51) Int. Cl.
*G06F 3/041*    (2006.01)
(52) U.S. Cl.
USPC .......................................... 345/174; 345/173
(58) Field of Classification Search
USPC ................................................ 345/173, 174
See application file for complete search history.

(56) References Cited

U.S. PATENT DOCUMENTS

| 2009/0256815 | A1* | 10/2009 | Westerinen et al. | 345/174 |
| 2010/0039406 | A1 | 2/2010 | Lee | |
| 2010/0134402 | A1* | 6/2010 | Groot Hulze | 345/102 |
| 2011/0157067 | A1* | 6/2011 | Wagner et al. | 345/174 |
| 2011/0242043 | A1* | 10/2011 | Yarvis et al. | 345/174 |
| 2011/0254802 | A1* | 10/2011 | Philipp | 345/174 |

FOREIGN PATENT DOCUMENTS

| CN | 101634917 A | 1/2010 |
| CN | 101776814 A | 7/2010 |
| TW | 201020667 | 6/2010 |

* cited by examiner

*Primary Examiner* — Amare Mengistu
*Assistant Examiner* — Jennifer Zubajlo
(74) *Attorney, Agent, or Firm* — Winston Hsu; Scott Margo

(57) ABSTRACT

A driving method for driving a touch sensitive display device is disclosed. The touch sensitive display device includes a plurality of pixel units and a plurality of touch sensors both arranged in matrixes. The driving method includes generating a plurality of source driving signals according to an image signal to indicate color intensities of the plurality of pixel units, generating a plurality of scanning impulses according to a synchronization signal to indicate an updating sequence of the plurality of pixel units, and shrinking duty cycles of the plurality of scanning impulses to generate a plurality of sensor scanning impulses for triggering the plurality of touch sensors.

10 Claims, 8 Drawing Sheets

DRIVING METHOD, DRIVING DEVICE AND TOUCH SENSITIVE DISPLAY DEVICE USING THE SAME

BACKGROUND OF THE INVENTION

1. Field of the Invention

The present invention is related to a driving method, driving device and touch sensitive display device using the same, and more particularly, to a driving method, driving device and touch sensitive display device using the same capable of preventing effects of noise interference on a touch sensing function.

2. Description of the Prior Art

With advances in manufacturing technology, a touch panel and a display panel are successfully integrated in an electronic device to enable the user to directly indicate desired tasks by touching the electronic device. In general, pixel units of the display panel and touch sensors of the touch panel are both arranged in two-dimensional matrixes, and sequences for updating frame data and detecting a touch point are determined based on scanning signals. Therefore, in R.O.C (Taiwan) patent application no. 099,110,384, the applicant of the present invention discloses a device and method for sharing the scanning signals such that the touch sensors can be directly triggered by scanning signals of the display panel instead of touch scanning signals generated by an extra driving circuit.

Please refer to FIG. 1, which is a schematic diagram of a touch sensitive display device 10 according to R.O.C patent no. 099,110,384. The touch sensitive display device 10 includes a display panel 100, a touch panel 110, a source driver 120, a gate driver 130 and a touch processor 140. The display panel 100 includes pixel units 102 arranged in a two-dimensional matrix. Similarly, the touch panel 110 includes touch sensors 112 arranged in a two-dimensional matrix. The source driver 120 generates source driving signals VS_1-VS_M according to an image signal FRM to indicate color intensities of the pixel units 102. The gate driver 130 generates scanning impulse VG_1-VG_N according to a synchronization signal SEQ to indicate an updating sequence of the pixel units 102. Meanwhile, the odd scanning signals VG_1, VG_3 . . . are further utilized for triggering the touch sensors 112. The triggered touch sensors 112 generate response impulses VR_1-VR_K. Since contacts on the touch sensors 112 result in capacitance or resistance variations thereof, response impulses generated by the touched touch sensors 112 are distinctive from response impulses generated by the untouched touch sensors 112. As a result, the touch processor 140 can determine the touch point located on the touch sensors 112 based on variations of the response impulses VR_1-VR_K and the odd scanning impulses.

Note that, the touch panel 110 is stacked upon the display panel 100 in the touch sensitive display device 10. Since the touch panel 110 requires lower resolution than the display panel 100, a plane density of the touch sensors 112 is lower than a plane density of the pixel units 102 to save manufacturing costs. That is, only a part of the scanning impulses VG_1-VG_N are further utilized for triggering the touch sensors 112.

Other than the stacked structure, the touch sensitive display device can be designed as an embedded structure. According to the embedded structure, the touch sensors are embedded within the pixel units. However, regardless of whether the stacked structure or the embedded structure is applied, the touch sensors are triggered while the pixel units are updated according to R.O.C. patent application no. 099,110,384. Therefore, voltage variations of the scanning impulses easily couple into the touch sensors, resulting in erroneous determination of the touch point. In other words, the scanning impulses VG_1-VG_N are used for dual purposes, and thus interfere with the touch sensors 112.

Therefore, reducing interference of the scanning impulses on the touch sensors has been a major focus of the industry.

SUMMARY OF THE INVENTION

It is therefore a primary objective of the claimed invention to provide a driving method, driving device and touch sensitive display device using the same.

The present invention discloses a driving method for driving a touch sensitive display device. The touch sensitive display device comprises a plurality of pixel units and a plurality of touch sensors both arranged in matrixes. The driving method comprises generating a plurality of source driving signals according to an image signal to indicate color intensities of the plurality of pixel units, generating a plurality of scanning impulses according to a synchronization signal to indicate an updating sequence of the plurality of pixel units, and shrinking duty cycles of the plurality of scanning impulses to generate a plurality of sensor scanning impulses for triggering the plurality of touch sensors.

The present invention further discloses a driving device for driving a touch sensitive display device. The touch sensitive display device comprises a plurality of pixel units and a plurality of touch sensors both arranged in matrixes. The driving device comprises a source driver for generating a plurality of source driving signals according to an image signal to indicate color intensities of the plurality of pixel units, a gate driver for generating a plurality of scanning impulses according to a synchronization signal to indicate an updating sequence of the plurality of pixel units, and an impulse reshape circuit coupled to the gate driver for shrinking duty cycles of the plurality of scanning impulses to generate a plurality of sensor scanning impulses for triggering the plurality of touch sensors.

The present invention further discloses a touch sensitive display device comprising a panel module comprising a display panel, comprising a substrate, and a plurality of pixel units arranged in a first matrix on the substrate, and a plurality of touch sensors arranged in a second matrix for sensing at least one touch point according to a plurality of sensor scanning impulses to generate a plurality of sensing impulses, and a driving device comprising a source driver coupled to the plurality of pixel units for generating a plurality of source driving signals according to an image signal to indicate color intensities of the plurality of pixel units, a gate driver coupled to the plurality of pixel units for generating a plurality of scanning impulses according to a synchronization signal to indicate an updating sequence of the plurality of pixel units, and an impulse reshape circuit coupled between the gate driver and the plurality of touch sensors for shrinking duty cycles of the plurality of scanning impulses to generate a plurality of sensor scanning impulses for triggering the plurality of touch sensors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
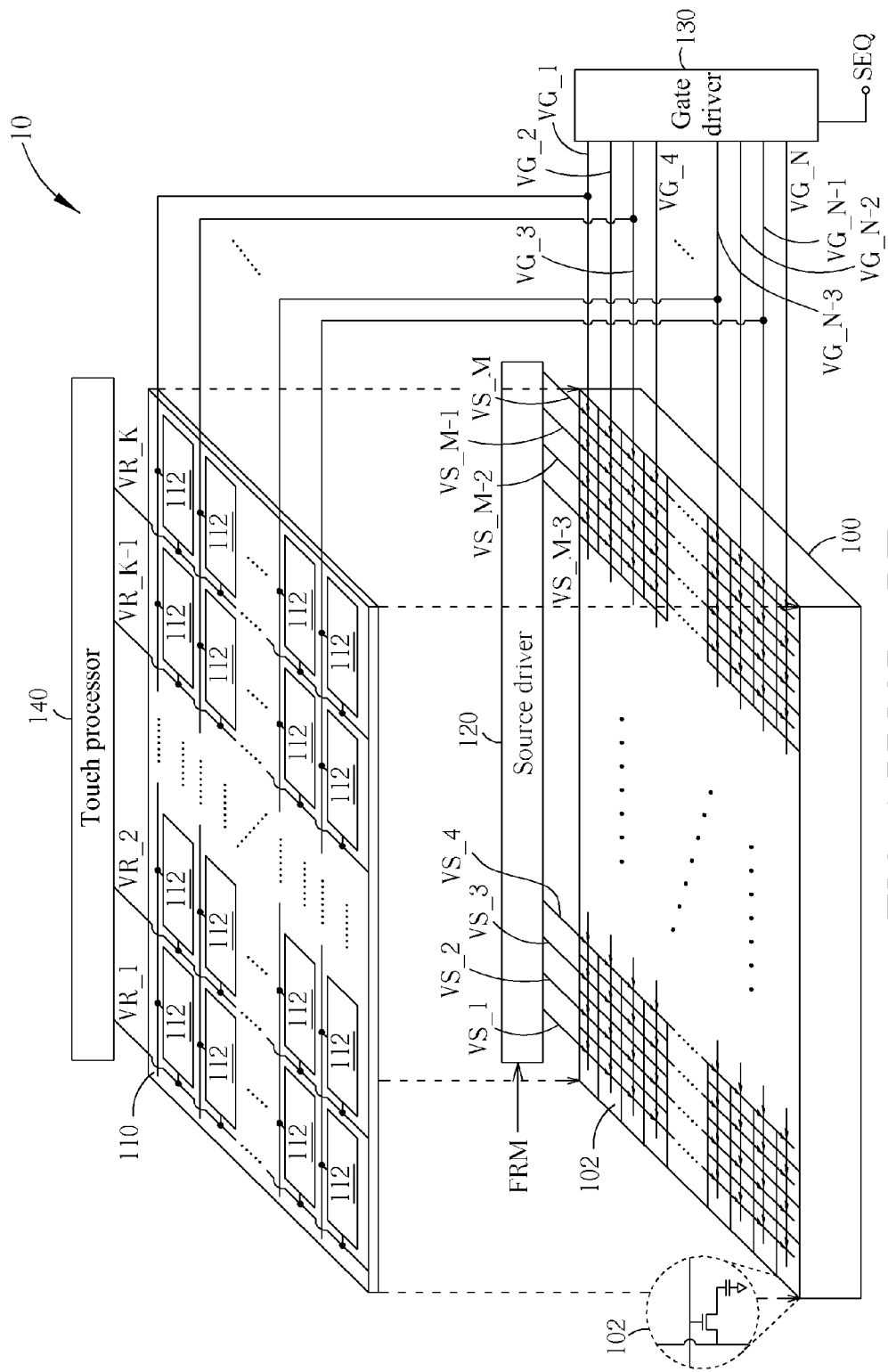
FIG. 1 is a schematic diagram of a touch sensitive display device of the prior art.
Figure 2:
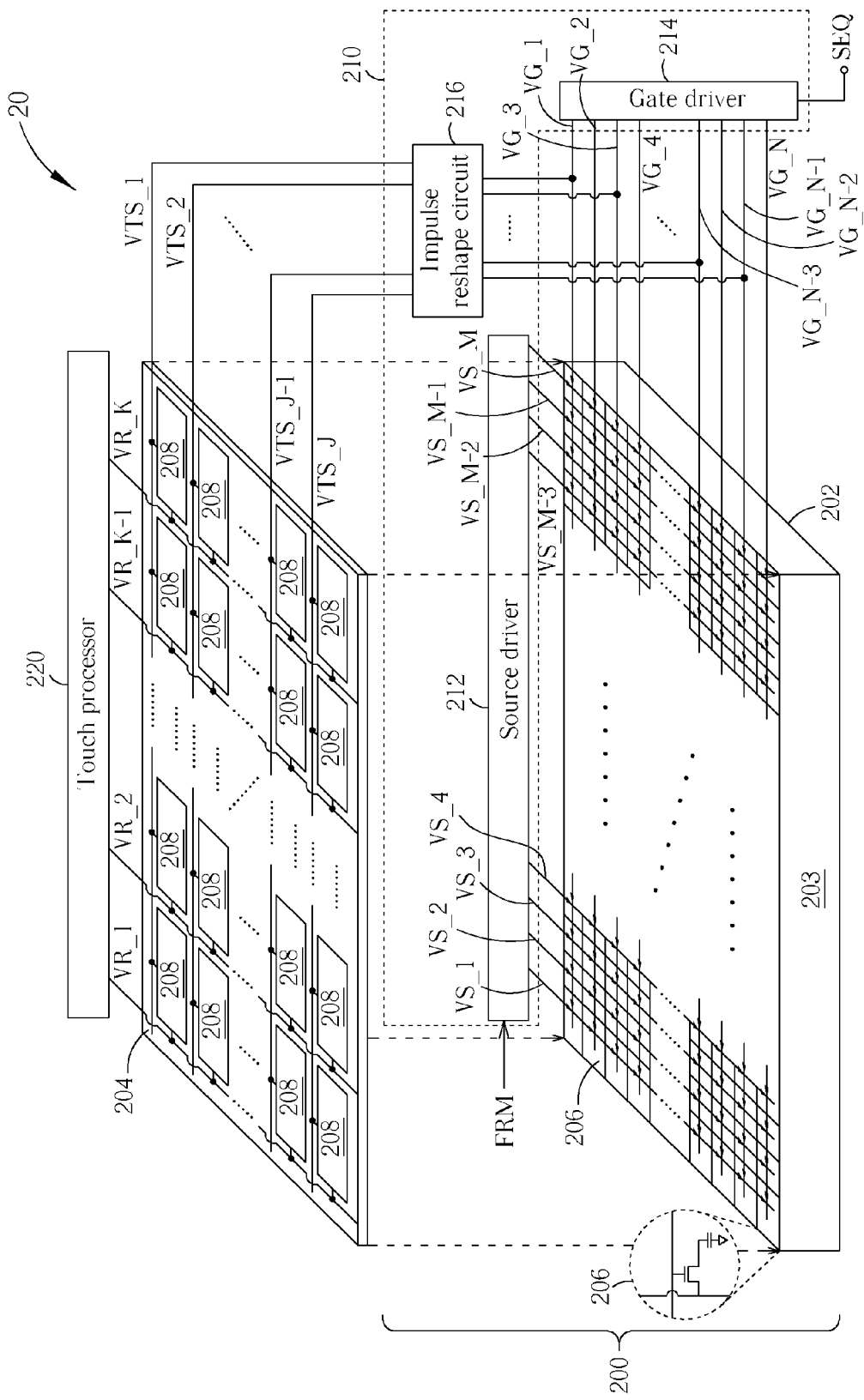
FIG. 2 is a schematic diagram of a touch sensitive display device according to an embodiment of the present invention.
Figure 3:
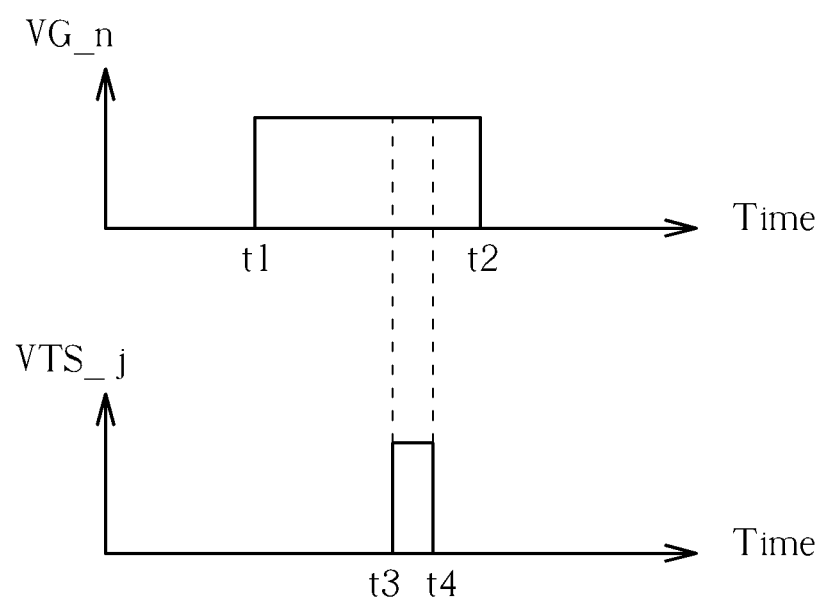
FIG. 3 is a timing diagram of a scanning impulse and a sensor scanning impulse of the touch sensitive display device shown in FIG. 2.

Please refer to FIG. 2, which is a schematic diagram of a touch sensitive display device 20 according to an embodiment of the present invention. The touch sensitive display device 20 includes a panel module 200, a driving device 210 and a touch processor 220. The panel module 200 includes a display panel 202 and a touch panel 204. The display panel 202 is utilized for displaying images, and includes a substrate 203 and pixel units 206 arranged in a matrix. The touch panel 204 includes touch sensors 208 arranged in a matrix for sensing one or multiple touch points created by a finger or an object according to sensor scanning impulses VTS_1-VTS_J to generate response impulses VR_1-VR_K. To simultaneously drive the pixel units 206 and the touch sensors 208, the driving device 210 includes a source driver 212, a gate driver 214 and an impulse reshape circuit 216. The source driver 212 is utilized for generating source driving signals VS_1-VS_M according to an image signal FRM to indicate color intensities of the pixel units 206. The gate driver 214 is utilized for generating scanning impulses VG_1-VG_N according to a synchronization signal SEQ to indicate an updating sequence of the pixel units 206. The impulse reshape circuit 216 is utilized for shrinking duty cycles of the scanning impulses VG_1-VG_N to generate sensor scanning impulses VTS_1-VTS_J (see FIG. 3) for triggering the touch sensors 208. Finally, the touch processor 220 determines the touch point according to response impulses VR_1-VR_K.

In short, to solve the interference problem induced by the shared scanning impulses VG_1-VG_N in the prior art, the impulse reshape circuit 216 adjusts waveforms of the scanning impulses VG_1-VG_N to stagger instants that the scanning impulses VG_1-VG_N and the touch scanning impulses VTS_1-VTS_J switch voltage potentials. For example, in FIG. 3, the impulse reshape circuit 216 shrinks an excited period of the scanning impulse VG_n (n=1~N), and accordingly generates the touch scanning impulse VTS_j (j=1~J). As a result, the scanning impulse VG_n and the touch scanning impulse VTS_j respectively switch voltage potentials at instants t1, t2 and instants t3, t4. Since the touch sensors 208 do not operate while the scanning impulses VG_1-VG_N switch voltage potentials, the touch sensors 208 are not affected by the scanning impulses VG_1-VG_N, which couple into the touch panel 204 through capacitance between the display panel 202 and the touch panel 204.

To ensure that the scanning impulses VG_1-VG_N do not interfere with the touch sensors 208, other than shrinking the duty cycles of the scanning impulses VG_1-VG_N, the impulse reshape circuit 216 has to differentiate instants that the touch scanning impulses VTS_1-VTS_J switch voltage potentials (e.g. t3 and t4) from instants that the scanning impulses VG_1-VG_N switch voltage potentials (e.g. t1 and t2).

Figure 4:
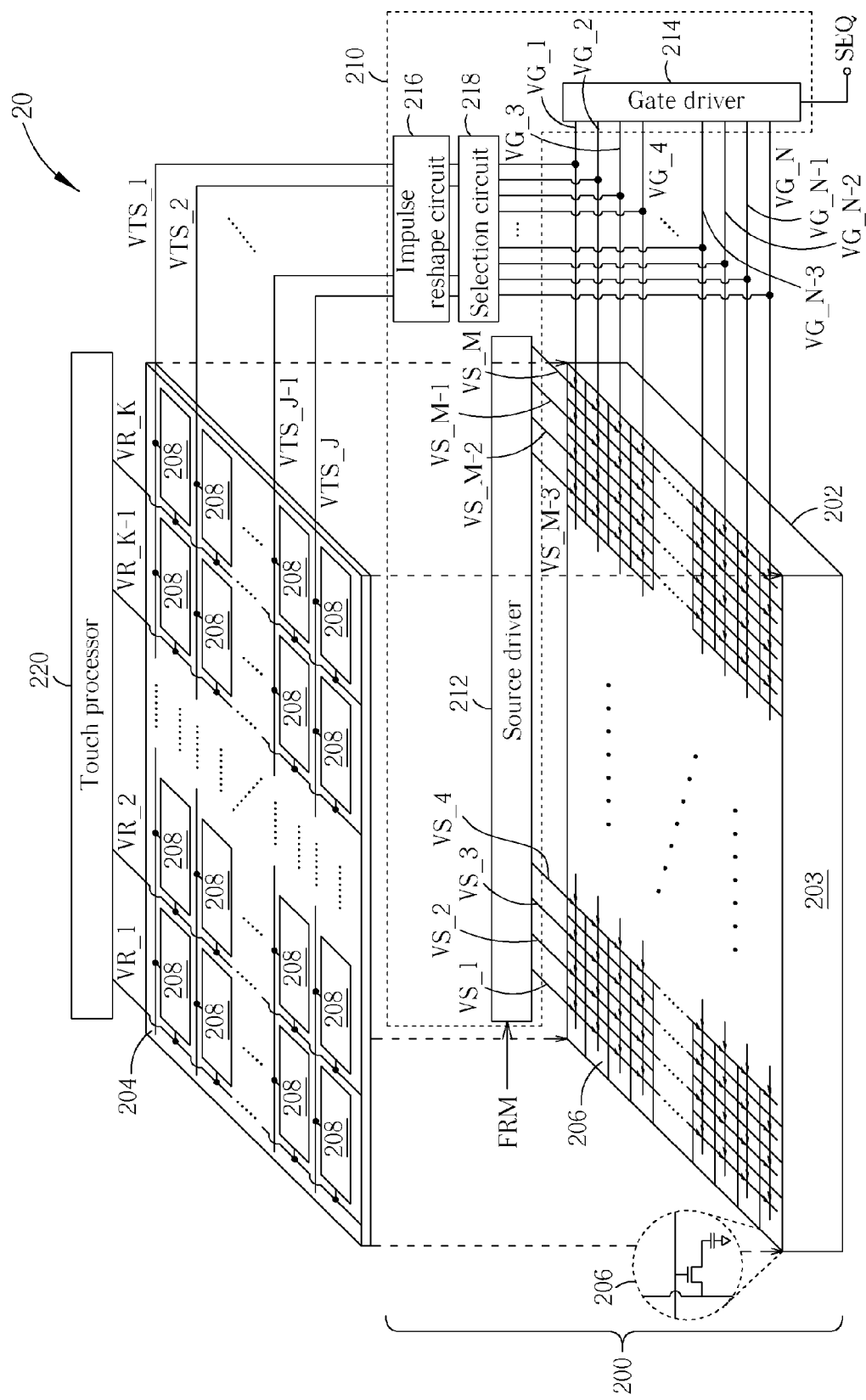
FIG. 4 is a schematic diagram of an alternative embodiment of the touch sensitive display device shown in FIG. 2.
Figure 5A:
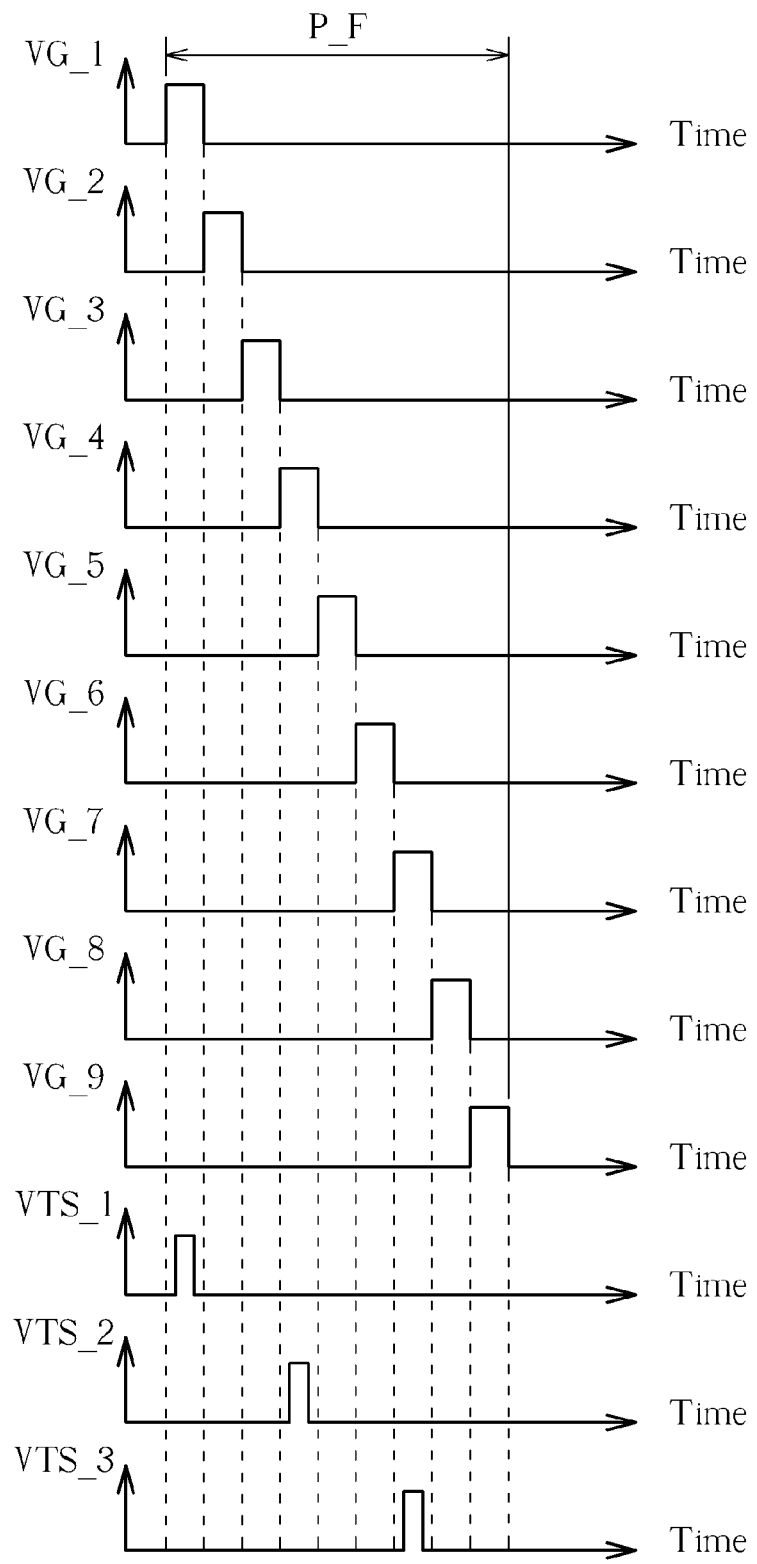
FIG. 5A is a timing diagram of scanning impulses and sensor scanning impulses of the touch sensitive display device shown in FIG. 2.
Figure 5B:
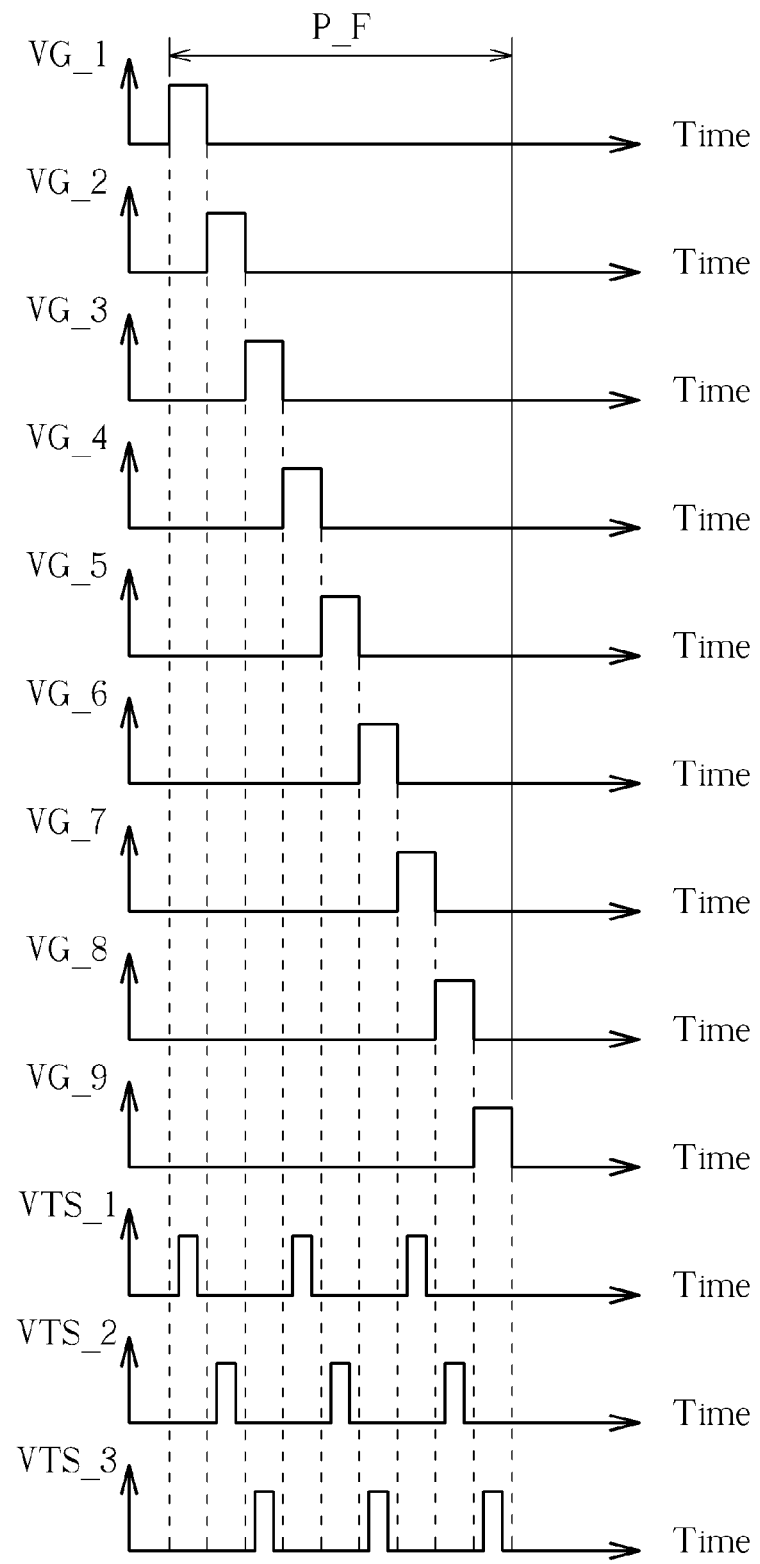
FIG. 5B is a timing diagram of scanning impulses and sensor scanning impulses of the touch sensitive display device shown in FIG. 4.

Note that, since the touch sensitive display device 20 is designed according to a stacked structure, the pixel units 206 and the touch sensor 208 are installed in different panels. In general, since the touch function requires lower resolution than the display function, a plane density of the touch sensor 208 is lower than a plane density of the pixel units 206, as illustrated in FIG. 2. That is, a number J of the touch scanning impulses VTS_1-VTS_J is smaller than a number N of the scanning impulses VG_1-VG_N. In such a situation, only a part of the scanning impulses are transmitted to the impulse reshape circuit 216. However, to enhance a scanning rate for the touch sensors 208, the driving device 210 further includes a selection circuit 218 for alternately selecting and transmitting a part of the scanning impulses VG_1-VG_N to the impulse reshape circuit 216, as illustrated in FIG. 4. For example, assume N=9 and J=3. Please refer to FIG. 5A and FIG. 5B, which are timing diagrams of the scanning impulses VG_1-VG_9 and the sensor scanning impulses VTS_1-VTS_3. In FIG. 5A, the scanning impulses VG_1, VG_4, VG_7 are directly transmitted to the impulse reshape circuit 216, and the corresponding touch scanning impulses VTS_1-VTS_3 scan the touch sensors one time for each vertical update period P_F. Otherwise, in FIG. 5B, the selection circuit 218 alternately selects the scanning impulses VG_1-VG_3, VG_4-VG_6 or VG_7-VG_9, and transmits the selected scanning impulses to the impulse reshape circuit 216. As a result, the corresponding touch scanning impulses VTS_1-VTS_3 scan the touch sensors three times for each vertical update period P_F to enhance the scanning rate.

Figure 6:
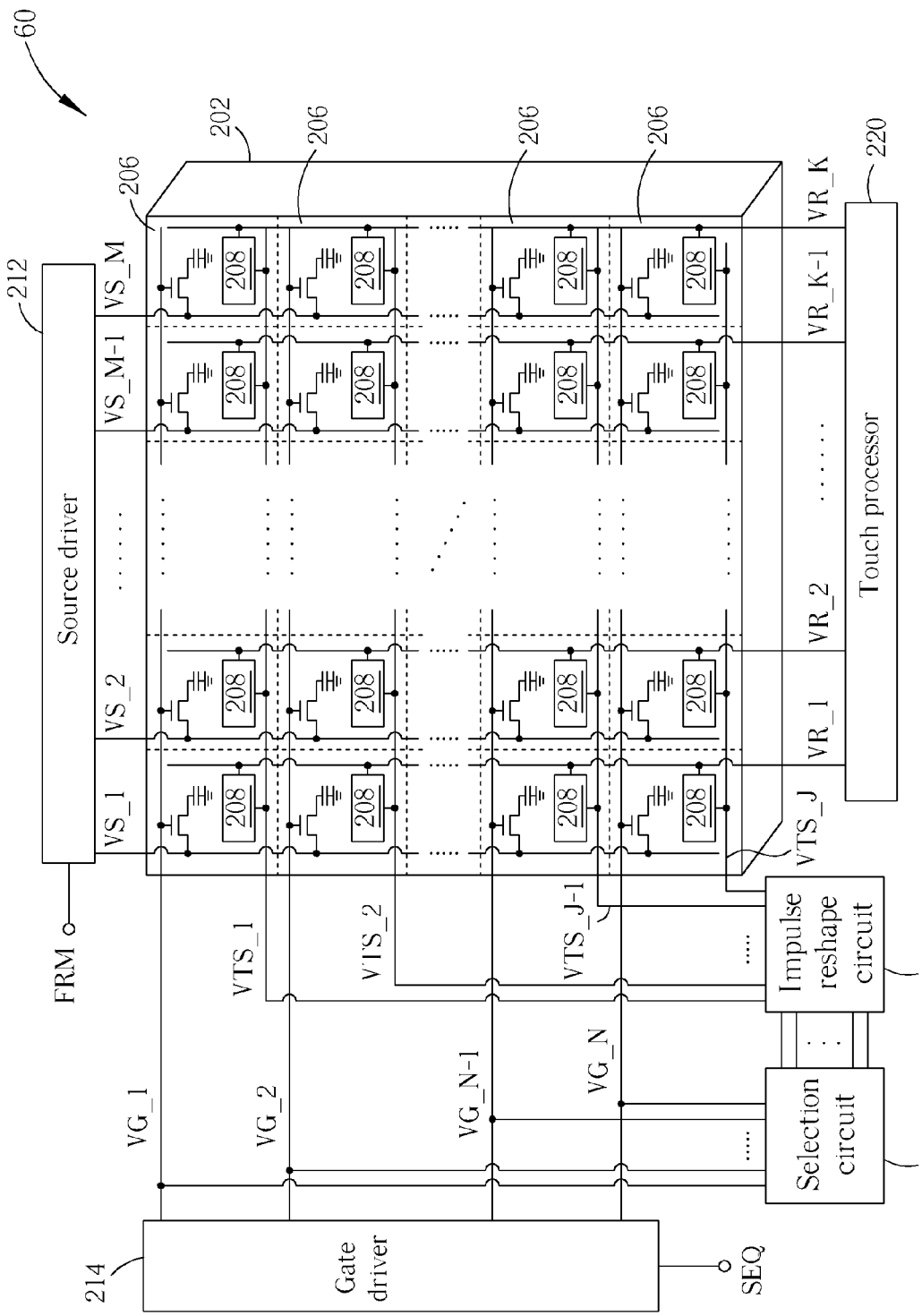
FIG. 6 is a schematic diagram of a touch sensitive display device with embedded touch sensors according to an embodiment of the present invention.

Other than the stacked structure, the present invention further can be applied to a touch sensitive display device 60 with an embedded structure, as illustrated in FIG. 6. In FIG. 6, the touch sensors 208 are embedded in the pixel units 206. That is, the driving method of the present invention is independent of circuit layout of the touch sensitive display device.

The touch sensitive display devices 20, 60 shown in FIG. 2, FIG. 4 and FIG. 6 are merely representative embodiments of the present invention, and can be modified by those skilled in the art according to different applications. For example, the plane density of the touch sensors 208 can be decreased in the touch sensitive display device 60. That is, only a part of the touch sensors 208 are embedded in the pixel units 206. In such a situation, the selection circuit 218 alternately selects and transmits a part of the scanning impulses to the impulse reshape circuit 216, as illustrated in FIG. 6.

Figure 7:
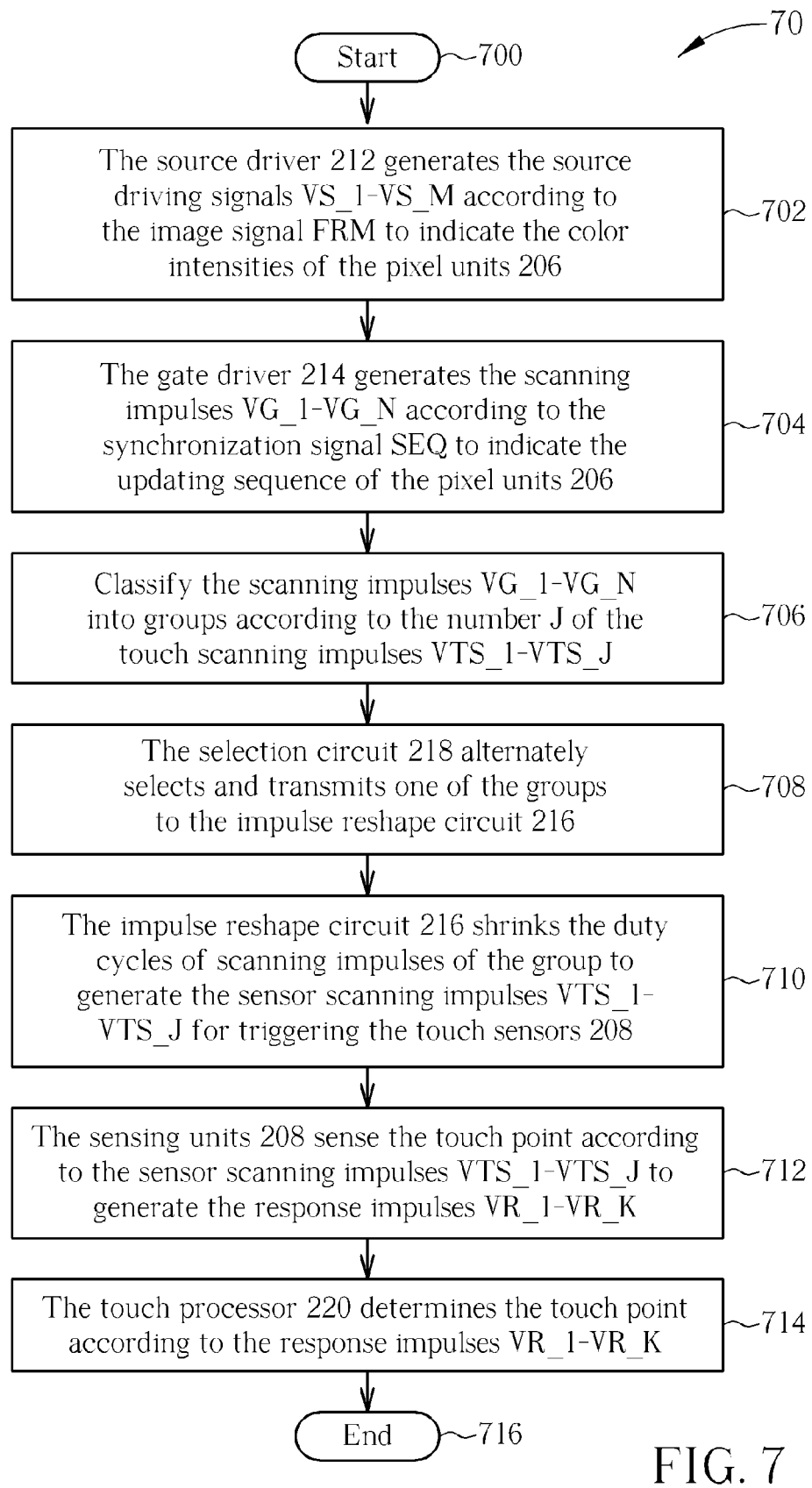
FIG. 7 is a schematic diagram of a driving process according to an embodiment of the present invention.

Operations of the touch sensitive display devices 20, 60 can be summarized into a driving process 70, as illustrated in FIG. 7. The driving process 70 includes the following steps:

Step 700: Start.

Step 702: The source driver 212 generates the source driving signals VS_1-VS_M according to the image signal FRM to indicate the color intensities of the pixel units 206.

Step 704: The gate driver 214 generates the scanning impulses VG_1-VG_N according to the synchronization signal SEQ to indicate the updating sequence of the pixel units 206.

Step 706: Classify the scanning impulses VG_1-VG_N into groups according to the number J of the touch scanning impulses VTS_1-VTS_J.

Step 708: The selection circuit 218 alternately selects and transmits one of the groups to the impulse reshape circuit 216.

Step 710: The impulse reshape circuit 216 shrinks the duty cycles of scanning impulses of the group to generate the sensor scanning impulses VTS_1-VTS_J for triggering the touch sensors 208.

Step 712: The sensing units 208 sense the touch point according to the sensor scanning impulses VTS_1-VTS_J to generate the response impulses VR_1-VR_K.

Step 714: The touch processor 220 determines the touch point according to the response impulses VR_1-VR_K.

Step 716: End.

Details of the driving process 70 can be referred in the above, and are not further narrated herein.

In the prior art, since the scanning impulses VG_1-VG_N simultaneously trigger the pixel units 102 and the touch sensors 112, voltage variations of the scanning impulses VG_1-VG_N interfere with the touch sensors 112 by the coupling effect, resulting in misjudgment for the touch point. In comparison, the present invention staggers activation timings of the pixel units 206 and the touch sensors 208 through reshaping waveforms of the scanning impulses VG_1-VG_N. As a result, while the scanning impulses VG_1-VG_N switch voltage potentials, the touch sensors 208 do not operate to avoid the misjudgment of the touch point.

To sum up, the present invention staggers activation timings of the pixel units and the touch sensors through reshaping waveforms of the scanning impulses to prevent the voltage variations of the scanning impulses from interfering with the touch sensors.

Those skilled in the art will readily observe that numerous modifications and alterations of the device and method may be made while retaining the teachings of the invention.

What is claimed is:

1. A driving method for driving a touch sensitive display device, the touch sensitive display device comprising a plurality of pixel units and a plurality of touch sensors both arranged in matrixes, the driving method comprising:
   generating a plurality of source driving signals according to an image signal to indicate color intensities of the plurality of pixel units;
   generating a plurality of scanning impulses according to a synchronization signal to indicate an updating sequence of the plurality of pixel units; and
   receiving the plurality of scanning impulses and shrinking duty cycles of the received scanning impulses to generate a plurality of sensor scanning impulses for triggering the plurality of touch sensors.

2. The driving method of claim 1, wherein instants that the plurality of sensor scanning impulses switch potentials are different from instants that the plurality of scanning impulses switch potentials.

3. The driving method of claim 1, wherein the step of shrinking the duty cycles of the plurality of scanning impulses to generate the plurality of sensor scanning impulses for triggering the plurality of touch sensors comprises:
   classifying the plurality of scanning impulses into at least one set according to a number required by the plurality of sensor scanning impulses;
   selecting one of the at least one set; and
   shrinking duty cycles of scanning impulses of the set to generate the plurality of sensor scanning impulses.

4. A driving device for driving a touch sensitive display device, the touch sensitive display device comprising a plurality of pixel units and a plurality of touch sensors both arranged in matrixes, the driving device comprising:
   a source driver, for generating a plurality of source driving signals according to an image signal to indicate color intensities of the plurality of pixel units;
   a gate driver, for generating a plurality of scanning impulses according to a synchronization signal to indicate an updating sequence of the plurality of pixel units; and
   an impulse reshape circuit, coupled to the gate driver, for receiving the plurality of scanning impulses from the gate driver and shrinking duty cycles of the received scanning impulses to generate a plurality of sensor scanning impulses for triggering the plurality of touch sensors.

5. The driving device of claim 4, wherein instants that the plurality of sensor scanning impulses switch potentials are different from instants that the plurality of scanning impulses switch potentials.

6. The driving device of claim 4 further comprising a selection circuit, coupled between the gate driver and the impulse reshape circuit, for selecting the plurality of scanning impulses and transmitting the plurality of scanning impulses to the impulse reshape circuit.

7. A touch sensitive display device comprising:
   a panel module, comprising:
      a display panel, comprising:
         a substrate; and
         a plurality of pixel units, arranged in a first matrix on the substrate; and
      a plurality of touch sensors, arranged in a second matrix, for sensing at least one touch point according to a plurality of sensor scanning impulses to generate a plurality of response impulses; and
   a driving device, comprising:
      a source driver, coupled to the plurality of pixel units, for generating a plurality of source driving signals according to an image signal to indicate color intensities of the plurality of pixel units;
      a gate driver, coupled to the plurality of pixel units, for generating a plurality of scanning impulses according to a synchronization signal to indicate an updating sequence of the plurality of pixel units; and
      an impulse reshape circuit, coupled between the gate driver and the plurality of touch sensors, for receiving the plurality of scanning impulses from the gate driver and shrinking duty cycles of the received scanning impulses to generate a plurality of sensor scanning impulses for triggering the plurality of touch sensors.

8. The touch sensitive display device of claim 7, wherein instants that the plurality of sensor scanning impulses switch potentials are different from instants that the plurality of scanning impulses switch potentials.

9. The touch sensitive display device of claim 7, wherein the driving device further comprises a selection circuit, coupled between the gate driver and the impulse reshape circuit, for selecting the plurality of scanning impulses and transmitting the plurality of scanning impulses to the impulse reshape circuit.

10. The touch sensitive display device of claim 7, wherein the plurality of touch sensors are embedded in the plurality of pixel units.

* * * * *